(12) United States Patent
Bruekers et al.

(10) Patent No.: US 7,533,266 B2
(45) Date of Patent: May 12, 2009

(54) WATERMARK-BASED ACCESS CONTROL METHOD AND DEVICE

(75) Inventors: Alphons Antonius Maria Lambertus Bruekers, Eindhoven (NL); Arnoldus Johannes Lucas Maria Maandonks, Eindhoven (NL); Peter-Paul Mittertreiner, Boxtel (NL); Johannes Francicus Echbertus Maria Verbruggen, Mill (NL)

(73) Assignee: Civolution B.V., Eindhoven (NL)

( * ) Notice: Subject to any disclaimer, the term of this patent is extended or adjusted under 35 U.S.C. 154(b) by 692 days.

(21) Appl. No.: 10/502,963

(22) PCT Filed: Jan. 20, 2003

(86) PCT No.: PCT/IB03/00214

§ 371 (c)(1),
(2), (4) Date: Jul. 29, 2004

(87) PCT Pub. No.: WO03/065723

PCT Pub. Date: Aug. 7, 2003

(65) Prior Publication Data

US 2005/0021967 A1    Jan. 27, 2005

(30) Foreign Application Priority Data

Feb. 1, 2002    (EP)    .................................. 02075418

(51) Int. Cl.
*H04L 9/00*    (2006.01)
(52) U.S. Cl. ...................................................... 713/176
(58) Field of Classification Search .................. 713/176
See application file for complete search history.

(56) References Cited

U.S. PATENT DOCUMENTS

| 6,368,111 B2* | 4/2002 | Legarda ....................... 434/236 |
| 6,442,285 B2* | 8/2002 | Rhoads et al. ............... 382/100 |
| 2003/0012548 A1* | 1/2003 | Levy et al. .................... 386/46 |

* cited by examiner

*Primary Examiner*—Kambiz Zand
*Assistant Examiner*—Andrew L Nalven
(74) *Attorney, Agent, or Firm*—Barnes & Thornburg LLP

(57) ABSTRACT

A method of controlling access to a resource using a verifying device uses watermarking device that embeds an authorization code in a signal using watermarking technology. The watermarked signal is then transmitted to a verifying device, e.g. as a television or radio program or as a commercial related to the resource. In the verifying device, the authorization code is extracted from the watermarked signal and an operation to be performed on the resource is authorized in dependence on the extracted authorization code. Preferably the authorization includes permission for executing a program, rendering and/or copying a multimedia object or for activating a cheat function in an electronic game.

12 Claims, 2 Drawing Sheets

WATERMARK-BASED ACCESS CONTROL METHOD AND DEVICE

Figure 1:
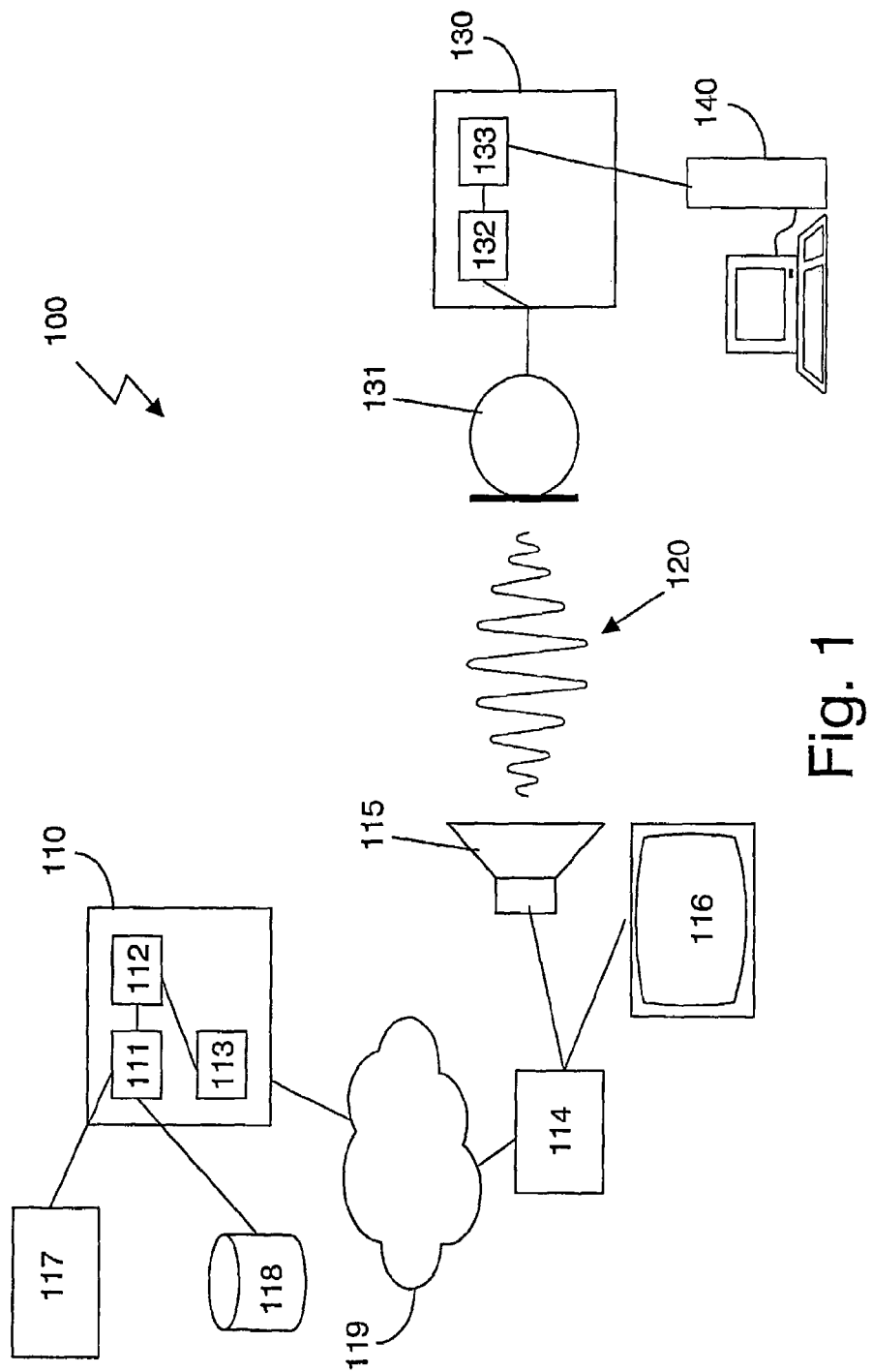

The invention relates to a method of controlling access to a resource such as a computer program or a multimedia object. The invention further relates to a verifying device arranged for controlling access to a resource.

Watermarking, the process of inserting extra information in a signal such as an audio or video signal, is an important and well-known technique to mark or protect those signals. A movie can be watermarked so its origin can be identified, or unauthorized copies can be distinguished from the original. Watermarks can be used with still images to locate copies reproduced by unauthorized third parties, by simply downloading images from the information services offered by those third parties and examining the downloaded images for the watermark.

Watermarks can also be used to embed metadata, such as an Internet Uniform Resource Locator (URL), in the input signal, for instance in a movie. Upon receiving a signal with the embedded extra information, a device can decode the URL and fetch the associated resource for displaying it to the user. A user who views the movie at his personal entertainment station can thus access the embedded metadata to access, for instance, the World-Wide Web site of the movie.

International patent application PCT/EP01/12712 by the same applicant as the present application describes how a command can be transmitted to a controllable device by embedding it using watermarking techniques in a signal like a television program or a piece of music. A watermark detector in the controllable device picks up the signal, preferably through the acoustical domain, detects the watermarked command and executes it. The controllable device is preferably embodied as a toy, which can then be controlled to "play along" with a children's television program.

In another application of watermarking, rights regarding the copying and/or playback of a multimedia object like a movie or song are embedded in the multimedia object using watermarking technology. A playback or copying apparatus can then extract these rights from the multimedia object and operate in accordance with the extracted rights, e.g. by refusing to copy the multimedia object if no copying rights are embedded in the object.

However, this application of watermarking suffers from the drawback that the rights embedded in the multimedia object cannot be easily modified. This makes it difficult to later provide additional rights, or to revoke previously granted rights for the multimedia object.

It is an object of the invention to provide a method according to the preamble, which provides a flexible way to authorize operations on the resource.

This object is achieved according to the invention in a method comprising embedding an authorization code in a signal by means of a watermark and transmitting the watermarked signal to a verifying device, and in the verifying device, extracting the authorization code from the watermarked signal and authorizing an operation to be performed on the resource in dependence on the extracted authorization code.

By embedding the authorization code using watermarks in a signal, the authorization codes can be supplied to. the verifying device without the need for special communication channels between an entity supplying authorization and the verifying device. In effect, the normally available audio and/or video transmission channels are used to supply authorization codes to the verifying device. Further, new authorization codes, as well as revocations for previously supplied authorization codes, can easily be supplied by embedding them in subsequent signals transmitted in the same way.

The signal in which the authorization code is embedded does not represent the resource to which the authorization code applies. Rather, the signal is merely used as a carrier for getting the authorization code to the verifying device controlling access to the resource.

In an embodiment the resource comprises a computer program and the authorization code causes the verifying device to grant permission for executing the program. Execution of programs can be controlled using so-called license managers. License managers are computer programs that control the execution of other programs based on license codes. Ordinarily these license codes have to be purchased from a supplier and entered into the license manager software to enable execution of the programs under its control. In this embodiment the license code is supplied as an authorization code embedded in a signal, making it possible to automatically extract the license code and supply it to the license manager. The license manager will then allow a user to execute the computer program based on the license code.

In a further embodiment the resource comprises a computer program and the authorization code causes the verifying device to grant permission for activating a module of the computer program. One way to promote a computer program is to distribute a so-called "shareware" version, in which part of the functionality is disabled. This allows potential buyers of the program to try it out for free. As the disabled functions can be seen but not used, users of the shareware version are encouraged to buy the whole program.

Typically buying the full version of a program is done by purchasing a license code that is to be entered in the shareware program. If the right code is entered, the disabled modules are enabled and the full functionality becomes available. This embodiment of the invention makes it possible to enable such a disabled module using a license code embedded in a signal such as a commercial promoting the computer program, or a television program reviewing the program.

In a further embodiment the resource comprises an electronic game and the authorization code causes the verifying device to grant permission for activating a cheat function in the electronic game. A cheat code allows the player of an electronic game to access functionality of the game that would normally not be accessible. For example, the player's character could be invincible in the game for a certain time, receive extra points or weapons, and so on.

Normally, such cheat codes are distributed as alphanumerical strings or sequences of buttons to be pressed ("press left-left-up-right-escape to become invincible"). In this embodiment the authorization code provides a cheat code for use in the electronic game. This makes it much easier for the player to activate the cheat function. The authorization code could be embedded in a television program related to electronic games. This encourages players to watch the television program because they want to obtain the cheat codes.

In a further embodiment the resource comprises a multimedia object and the authorization code causes the verifying device to grant permission for at least one of: a rendering of the multimedia object and the making of a copy of the multimedia object. Digital rights management (DRM) systems can be used to enforce restrictions on rendering and/or copying of multimedia objects. This forces people to obtain "rights" or permissions for rendering and/or copying. The present invention makes it possible to grant these "rights" by embedding them in signals likely to be received by verifying devices coupled to DRM systems.

The signal could e.g. represent an advertisement related to the multimedia object. If, after hearing the advertisement a user receives a (preferably one-time) playback right for a multimedia object, he will be greatly encouraged to also view future advertisements, and to buy the advertised product, which will typically be an item like a record carrier comprising the multimedia object or a concert by the artist performing the multimedia object.

Preferably, in the above embodiments the permission is limited in time. This way, the effect of the permission can be limited to a certain time period. It also realizes a greater audience for entities transmitting the watermarked signals, such as television broadcasters, radio stations and so on, as people wishing to make use of the authorization codes now must obtain these codes before the limited time expires.

In a further embodiment the resource comprises a computer program and the authorization code causes the verifying device to revoke a previously granted permission for executing the program. This makes it possible to distribute programs that are only supposed to be executed for a limited time, such as beta or test versions of a program.

In a variant of this embodiment the authorization code further causes the verifying device to authorize a further operation to be performed on the resource. It is to be expected that users will try to avoid receiving authorization codes that revoke previously granted permissions. One way to overcome this problem is to provide a positive authorization together with the revocation.

For example, if the authorization code revokes permission to execute a beta version of a computer program, it could at the same time grant permission to execute the official release version of that computer program. This way a beta tester is encouraged to allow revocation of the beta version. Preferably this further authorization is delayed until a predetermined time has elapsed after the revocation took place.

In a further embodiment the signal comprises an advertisement related to the resource. This has the advantage that a person listening to or viewing the signal can easily associate any authorizations granted by the embedded authorization codes with resources to which the authorizations apply. Further, it encourages the viewing or listening to advertisements.

It is a further object of the invention to provide a verifying device according to the preamble, which is capable of handling authorizations in a flexible matter.

This object is achieved according to the invention in a verifying device comprising receiving means for receiving a watermarked signal, watermark detection means for detecting an authorization code embedded in the watermarked signal, and access control means for authorizing an operation to be performed on the resource in dependence on the extracted authorization code.

A very flexible channel is obtained by transporting the authorization code to the verifying device embedded in a watermark in a signal. If new, updated or otherwise modified authorization codes need to be supplied, or previously granted permissions need to be revoked, they can simply be embedded in a new signal transmitted to the verifying device. The verifying device does not need to have a special connection to any entity supplying authorization codes. It could simply tune in to broadcasted radio or TV signals, or detect watermarks in audio signals picked up using a microphone, and so on.

Thus, in terms of technical effects produced by the invention, the verifying device no longer needs a separate channel for receiving authorizations, can handle authorizations varying in time for one particular multimedia object without having to update the multimedia object, and can activate, modify or deactivate functionality in a resource like a computer.

In an embodiment the authorization code comprises a timestamp and the access control means are arranged for authorizing the operation further in dependence on a comparison of the timestamp against a current time. This way the access control means can determine the validity of the extracted authorization code. The access control means can then ignore authorization codes extracted after the end of a validity period indicated by the timestamp, and/or automatically revoke authorizations granted once the validity indicated by the timestamp expires.

The invention further relates to a computer program product arranged for causing a general purpose computer to function as the verifying device of the invention. The invention further relates to a signal in which an authorization code is embedded by means of a watermark. Preferably the computer program product and/or the signal are embodied on a carrier such as a compact disc, a Digital Versatile Disc, a video tape or a floppy disc.

Figure 2:
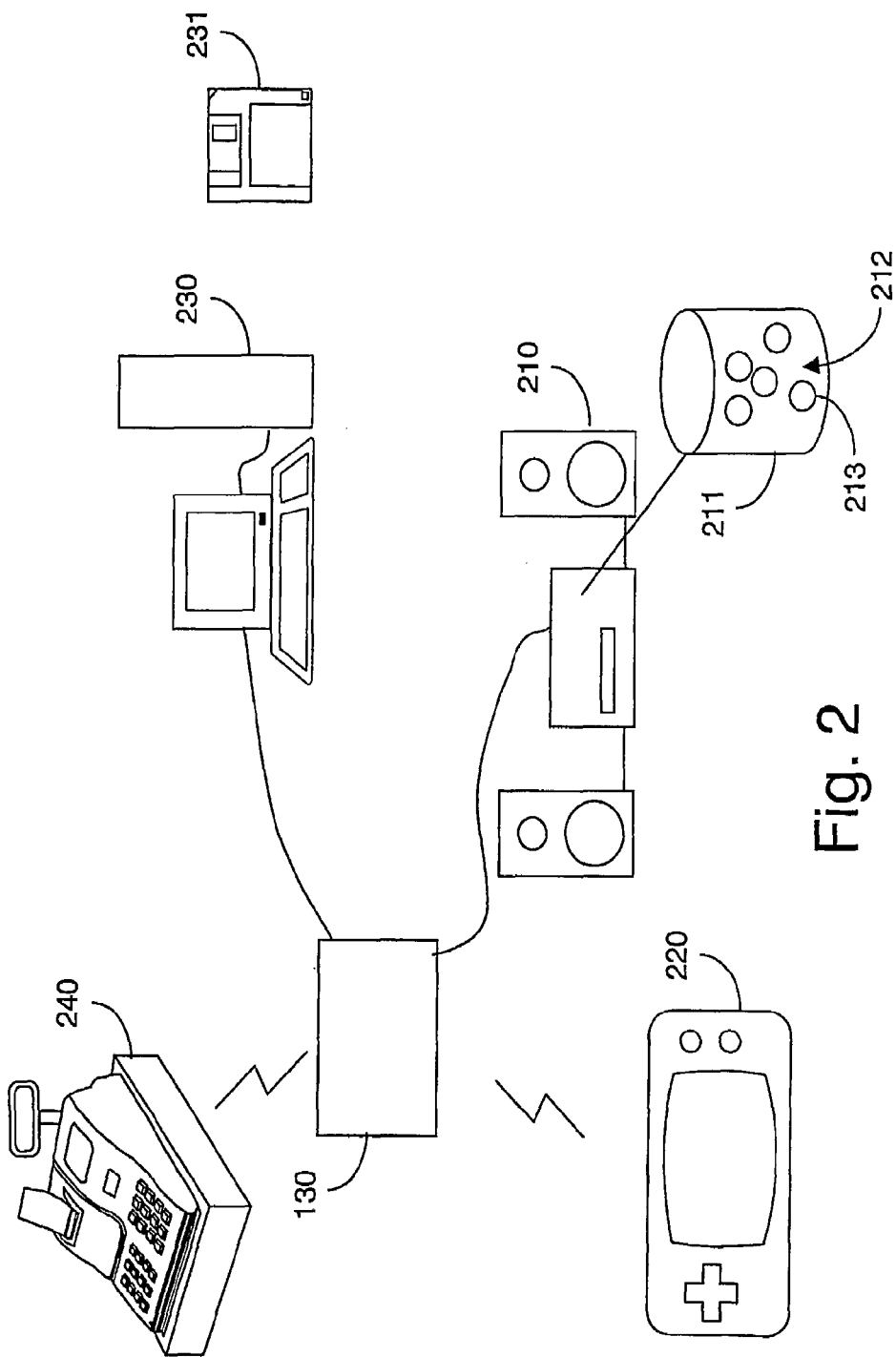

These and other aspects of the invention will be apparent from and elucidated with reference to the embodiments shown in the drawing, in which:

FIG. 1 schematically shows a system comprising a transmitter and a verifying device in accordance with the invention;

FIG. 2 schematically illustrates various applications of the method according to the invention.

Throughout the figures, same reference numerals indicate similar or corresponding features. Some of the features indicated in the drawings are typically implemented in software, and as such represent software entities, such as software modules or objects.

FIG. 1 schematically shows a system 100 comprising a watermarking device 110, a rendering device 114, a network 119 and a verifying device 130 configured to control access to a resource 140.

A receiving module 111 in the watermarking device 110 receives a content item, which is for instance a television program, a radio program, a movie, an advertisement or commercial, a picture or a sound or a portion thereof. It is usually received through a network such as the Internet, a satellite feed or a home network from a distributor 117 such as a television broadcasting organization. Alternatively, it can be loaded from local storage 118 which can be a tape or a disk such as a DVD or Video CD. It can also be a hard disk on which it has been previously recorded for later viewing.

In accordance with the invention, an authorizing module 112 determines an authorization code that is to be embedded in the content item. The authorization code can e.g. be obtained from an external source, be read from local storage 118 or be input by an operator of the watermarking device 110. A more detailed description of possible authorization codes and their uses can be found below with reference to FIG. 2.

An embedding module 113 embeds the authorization code in the content item, producing watermarked signal 120, using any kind of watermarking or other steganographic technique appropriate for the content 116. The watermarked signal 120 is then fed to rendering device 114 over a transmission medium 119, which can be e.g. a network such as the Internet, a satellite feed or a cable television network.

The rendering device 114 outputs the received signal 120 using audio output module 115 and/or video output module 116. If the signal 120 comprises audio and video signals, respective outputs may be synchronized with each other. In this embodiment the watermarked signal 120 is an audio signal, but it can equally well be a video signal. By rendering the watermarked signal 120 in this fashion, the verifying device 130 is able to receive it. Alternatively, the watermarked signal 120 could be transmitted directly to the verifying device 130, for example using a network connection between the watermarking device 110 and the verifying device 130.

The verifying device 130 comprises receiving module 131, decoding module 132 and access control module 133. The receiving module 131 receives the watermarked audio signal 120 and feeds it to the decoding module 132. The receiving module 131 can be for instance a microphone, a camera or a light sensitive sensor of some kind.

The decoding module 132 processes the watermarked audio signal 120 to obtain the authorization code embedded therein. Detecting a watermark and extracting embedded information is well known in the art and will not be elaborated upon further. The authorization code is then fed to the access control module 133.

The access control module 133 is arranged to control access to a resource 140, which in the embodiment of FIG. 1 comprises a computer program running on a personal computer. In the context of computer programs, controlling access refers to things like granting permission for execution of the program, revoking a previously granted permission for execution of the program, granting permission for activation of a module of the program and so on. A user of the personal computer will be unable to execute the program or activate the module unless permission has been granted by the access control module 133. Ways for controlling access are discussed more extensively with reference to FIG. 2 below.

In accordance with the invention, the access control module 133 controls access to the resource 140 in dependence on the authorization code extracted from the watermarked signal 120 by the decoding module 132. This way, it is possible to grant or revoke permissions, or to otherwise control access to the resource 140, in a very flexible way by simply transmitting a new watermarked signal with an authorization code every time a new permission is to be granted or revoked.

The watermarking device 110 can be realized as a computer program product being arranged for causing a processor to execute the steps described above. The computer program product enables a programmable device when executing said computer program product to function as the watermarking device 110. Similarly, the verifying device 130 can be realized as a computer program product enabling a programmable device when executing said computer program product to function as the verifying device 130.

The above description gives a general overview of the functionality of distributing watermarked content. Various ways are possible to realize the watermarking device 110 and the verifying device 130, with different advantages and possibilities.

FIG. 2 schematically illustrates various applications of the method according to the invention. The verifying device 130 is in FIG. 2 operably connected to a content playback apparatus 210, a gaming device 220, a personal computer 230, and a cash register 240. Using this connection, the verifying device 130 can control access to and/or operations of the devices 210, 220, 230, 240. Of course the verifying device 130 could also be connected to a great variety of other devices, such as telephone booths, vending machines, Internet access terminals or toys.

The connection between the verifying device 130 and the devices 210, 220, 230, 240 can be wired or wireless, depending on what kind of device verifying device 130 is connected to. In FIG. 2, the connection with the gaming device 220 and the cash register 240 is wireless, and the connection with the devices 210 and 230 is wired. The verifying device 130 can also be embodied as a component installed inside the devices 210, 220, 230, 240.

When an authorization code is extracted from the watermarked signal 120, the access control module 133 checks whether the authorization code is applicable for any of the resources to which is connected: If this is not the case, the authorization code is ignored. Otherwise the access control module 133 performs an action appropriate for the authorization code and the resource to which the code applies. This will now be illustrated using various exemplary, non-limiting embodiments.

In a first example, the resource comprises a computer program 231 to be executed on the personal computer 230. The verifying device 130 is now preferably realized as a computer program running on the personal computer 230, although it could also be realized as one or more hardware modules installed in the personal computer 230, or as a separate device like in FIG. 2. Embodying the verifying device 130 as a part of the personal computer 230 has the advantage that components like the microphone 131 can be omitted, as they are usually present in the personal computer 230 already.

The authorization code now represents a license code granting permission for executing the computer program 231. By itself it is known in the field of computer software that execution of programs can be controlled using so-called license managers. License managers are computer programs that control the execution of other programs based on license codes. These known techniques can be adapted to work with the invention by supplying the authorization code to the license manager, which will subsequently allow a user to execute the computer program 231 based on the authorization code.

In a related embodiment, the computer program 231 is a so-called "shareware" application, in which certain modules providing certain functionality are disabled until the user supplies an authorization code. Usually the authorization code is supplied by the creator of the program after the user makes a payment. In accordance with the invention, the authorization code is embedded in the watermarked signal 120, which preferably is a commercial for the computer program 231.

Another example involves the gaming device 220. This device 220 could be a hand-held gaming console, an arcade game machine or a computer program running on a general purpose or specially adapted computer. Of course the gaming device 220 usually operates essentially in the same way as the personal computer 230, so the license codes could also be supplied to the gaming device 220 to enable execution of particular games, or to allow access to certain parts of a game (which are modules of the game software). For example, extra "levels" in the game could be made available.

Many electronic games have so-called "cheat functions". Using these functions a player could for example easily get extra weapons or other objects for use in the game, earn extra points, walk through walls, get access to a map of the entire gaming environment, and so on. Typically the code necessary to activate a cheat function is supplied by pressing a specific sequence on a keyboard and/or operating a joystick in a particular way. In accordance with the invention, this code is supplied by the verifying device 130.

One particularly useful extension of this example involves television programs that discuss and/or review electronic games. A popular feature in such programs is providing cheat codes. In prior art systems this is done by verbally or graphically listing the keyboard sequences necessary to activate the cheat function. However, the invention makes it possible to embed the cheat code in the television program at the appropriate moment, so that the verifying device 130 can pick up the signal, extract the cheat code and supply the extracted code to the gaming device 220.

If the verifying device 130 is embodied as a part of the gaming device 220, then a player wishing to obtain a cheat code merely needs to watch the television program and use his gaming device 220 to pick up the signal when the cheat codes are being supplied. The gaming device 220 will then automatically detect the cheat codes.

Another useful application of the method according to the invention allows controlling access to copy protected multimedia objects like music, movies and so on. A digital rights management (DRM) system installed in the content playback apparatus 210 enforces restrictions on copying and/or playback of multimedia objects 212 e.g. stored in storage medium 211. These restrictions can be provided by embedding them in the multimedia objects using watermarking technology. For example, a multimedia object 213 could be made available for free on a web site, with the restriction that it can only be played back during the next week embedded in the object 213.

If a user attempts to play back that multimedia object 213 after that time period, the DRM system prohibits this. From that moment on the user must obtain authorization for playback in some other fashion, usually by buying a playback right from the copyright holder. In accordance with the invention, the authorization code comprises such a playback right. For example, if a radio station to which the user is listening broadcasts a specimen of the multimedia object 213, a one-time playback right could be embedded in the broadcast signal. The verifying device 130 picks up the one-time playback right and supplies it to the DRM system, so that the user gets an opportunity to play back the multimedia object 213 once.

This approach can, next to playback rights, also be used for copying rights. This allows the user to make a copy of a multimedia object when a signal comprising the appropriate authentication code is broadcast or transmitted to him otherwise.

Preferably the signal comprises an advertisement related to the multimedia object. For example, a record label might release a compact disc with a number of songs by one particular artist or group. To promote this release, advertisements are transmitted over radio and TV channels. The potential audience for this release most likely already has several multimedia objects comprising particular songs in its possession. By granting a one time playback right embedded in the advertisement, the record label encourages its potential audience to listen to its advertisements and whets the appetite for the compact disc because the audience will use the playback right to listen to the particular songs in its possession, and so become excited about the artist.

The verifying device 130 can also be connected to the cash register 240. The authorization code in that case preferably grants permission to the cash register 240 for applying a discount to a purchase being effected using the cash register 240. Using this embodiment an advertiser could easily offer discounts on his products by embedding discount codes into the watermarked signal 120. Consumers can pick up the watermarked signal 120 using the verifying device 130 and supply the extracted authorization code at a store to a sales clerk operating the cash register 240. The clerk subsequently enters the authorization code into the cash register 240, so that the discount is applied to the price of the product.

In this embodiment it may be advantageous to fit the verifying device 130 with the display on which the access control module 133 can display the authorization code. Alternatively, using a wired or wireless connection (for example using Bluetooth) the access control module 133 could feed the authorization code directly to the cash register 240.

Preferably the permission is limited in time. This can be realized by adding a timestamp to the authorization code. A timestamp usually indicates the time at which the permission becomes valid, and/or the time at which the permission ceases to be valid. Alternatively, the timestamp could comprises a time period during which the permission is valid.

If the access control module 133 detects that a timestamp was added to the authorization code, it compares the timestamp against the current time as measured in the verifying device 130. This may require the installation of a real-time clock in the verifying device 130. If the current time exceeds the latest time at which the permission is valid according to the timestamp, the authorization code is rejected as invalid because it has expired.

The authorization code alternatively comprises an indication that a previously granted permission is to be revoked. The access control module 133 then revokes this permission. In the example involving computer program 231, this could be realized by signaling to the license manager that the license code for the computer program 231 is to be deleted, revoked or disabled.

Access control module 133 could also keep track of the time at which an authorization code was received, and automatically revoke a permission granted by an authorization code if the current time exceeds a certain amount of time after the time at which the code was received. If the authorization code comprises a timestamp indicating the end of the validity period, the access control module 133 automatically revokes the permission when the time indicated in the timestamp is reached.

It is to be expected that users will try to avoid receiving authorization codes that revoke previously granted permissions. One way to overcome this problem is to provide a positive authorization together with the revocation. For example, if the authorization code revokes permission to execute a beta or test version of a computer program, it could at the same time grant permission to execute the official release version of that computer program. This way a beta tester is encouraged to allow revocation of the beta version. Preferably this further authorization is delayed until a predetermined time has elapsed after the revocation took place.

It should be noted that the above-mentioned embodiments illustrate rather than limit the invention, and that those skilled in the art will be able to design many alternative embodiments without departing from the scope of the appended claims. For example, multiple authorization codes could be embedded in one or multiple watermarks in the signal. Next to an authorization code embedded in a signal using a watermark, additional codes could be provided in other channels, such as by using audible signals, by providing them in a Teletext channel, or visually showing them in a video signal or in an image. Different verifying devices could authorize different operations based on one authorization code in one signal received by both.

Rather than, or in addition to, being limited in time, the authorization can also be limited in space. This can be realized by e.g. adding an address on a computer network (like an IP address or hostname) to the authorization code, or by including Global Positioning System coordinates in the authorization code. The authorization code can also contain one or more other properties of the verifying device 130 to limit the scope of the authorization.

If the authorizations are limited in time, it becomes possible to require owners of the device 140 to periodically expose themselves to content with new authorizations. For instance, a toy could be given away for free with an initial authorization in place that is limited in time (say, a week). After that, the owner of the toy must periodically visit a location in which the device 114 is installed, preferably a fast food restaurant or toy store.

The signal 120 produced by the device 114 grants the toy a new time-limited authorization so it operates for another week. If the owner does not visit the location every week, the toy ceases functioning or limits its abilities.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of controlling access to a resource signal, comprising embedding an authorization code in a signal by means of a watermark and transmitting the watermarked signal to a verifying device, and in the verifying device, extracting the authorization code from the watermarked signal and authorizing an operation to be performed on the resource signal in dependence on the extracted authorization code, the resource signal including media content and being distinct from the watermarked signal.

2. The method of claim 1, in which the resource signal comprises a computer program and the authorization code causes the verifying device to grant permission for executing the program.

3. The method of claim 1, in which the resource signal comprises a computer program and the authorization code causes the verifying device to grant permission for activating a module of the computer program.

4. The method of claim 1, in which the resource signal comprises an electronic game and the authorization code causes the verifying device to grant permission for activating a cheat function in the electronic game.

5. The method of claim 1, in which the resource signal comprises a multimedia object and the authorization code causes the verifying device to grant permission for at least one of: a rendering of the multimedia object and the making of a copy of the multimedia object.

6. The method of claim 2, in which the permission is limited in time.

7. The method of claim 1, in which the resource signal comprises a computer program and the authorization code causes the verifying device to revoke a previously granted permission for executing the program.

8. The method of claim 7, in which the authorization code further causes the verifying device to authorize a further operation to be performed on the resource signal.

9. The method of claim 1, in which the signal comprises an advertisement related to the resource signal.

10. A verifying device arranged for controlling access to a resource signal, comprising receiving means for receiving a watermarked signal, watermark detection means for detecting an authorization code embedded in the watermarked signal, and access control means for authorizing an operation to be performed on the resource signal in dependence on the extracted authorization code, the resource signal including media content and being distinct from the watermarked signal.

11. The verifying device of claim 10, in which the authorization code comprises a timestamp and the access control means are arranged for authorizing the operation further in dependence on a comparison of the timestamp against a current time.

12. A computer program product arranged for causing a general purpose computer to function as the verifying device of claim 9.

* * * * *